United States Patent [19]

Biegler

[11] 4,198,400
[45] Apr. 15, 1980

[54] WATER-RECONSTITUTABLE JUICE AND SOUP COMPOSITIONS

[76] Inventor: Myron A. Biegler, 2 Palo Alto Sq., Palo Alto, Calif. 94304

[21] Appl. No.: 914,430

[22] Filed: Jun. 12, 1978

[51] Int. Cl.$^2$ .................. A61K 31/70; A61K 31/725
[52] U.S. Cl. .................................. 424/180; 426/589; 426/590; 536/1
[58] Field of Search ............... 424/180; 426/803, 804, 426/589, 590, 599, 577

[56] References Cited

U.S. PATENT DOCUMENTS

| | | | |
|---|---|---|---|
| 2,865,757 | 12/1958 | Aurell | 424/180 |
| 2,952,548 | 9/1960 | Work | 424/180 |
| 3,190,756 | 6/1965 | Aurell | 424/180 |

*Primary Examiner*—Johnnie R. Brown
*Assistant Examiner*—Blondel Hazel
*Attorney, Agent, or Firm*—Kane, Dalsimer, Kane, Sullivan and Kurucz

[57] ABSTRACT

Juice and soup compositions prepared by addition of water to dry ingredients and which have a mouth feel simulating fresh squeezed or naturally thickened pulping material are disclosed. They are prepared through the combining of dietary fiber substances having hydrophobic and hydrophilic characteristics depending on a coating treatment. A range of "body" producing materials have resulted from varying the ratio of "smoothage" to "roughage" materials in the compositions. When ingested, these dietary fibers produce bulk in the colon and promote regularity as well as satiety to dieters.

14 Claims, No Drawings

WATER-RECONSTITUTABLE JUICE AND SOUP COMPOSITIONS

BACKGROUND OF THE INVENTION

1. Field of the Invention

The invention relates to prepared foods and more particularly relates to water-reconstitutable juice and soup compositions and to methods of their manufacture.

2. Brief Description of the Prior Art

Numerous publications and scientific articles have disclosed that pectin, protopectin, gums and mucilages have useful water absorbing and stool softening or dietary fiber functions. They have been referred to as substances lending "smoothage" to a dietary product. On the other hand, bran and its cellulose and hemicellulose components have been shown to have useful dietary and bulking fiber effects and have been referred to as substances lending "roughage" to a dietary product.

Substitutes for fresh fruit juices such as orange juice have become very popular and are currently in wide use. Many of these products consist mainly of sugar and flavoring. It has been noted that one of the primary problems encountered in the manufacture of substitute fruit juices, such as a synthetic orange juice, is the thinness of the orange juice. Such juices more closely simulate canned orange juice or bottled orange drinks rather than freshly squeezed orange juice. Several products have been developed in Europe where portions of orange sac and some of the orange albedo have been dried and incorporated into such drinks to simulate the natural material, but these substances are at low levels in the composition and serve almost as artifacts to remind the drinker that freshly squeezed orange juice contains a certain amount of orange sac material. The result, however, is still a very thin product which again is more similar to canned orange juice than to naturally squeezed orange juice. Further, it has been noted that there are very few synthetic tomato juices or tomato soups which have thickening in them which will remain thick, without forming a heavy gel. The gel is unpleasant in mouth feel.

The water-reconstituted compositions of my invention have a mouth feel simulating the natural products they substitute for. The compositions are prepared by a novel combination of certain dietary fiber materials which have hydrophobic and hydrophilic characteristics and which contribute specific slippery or smooth characteristics, and others which provide thickening characteristics. In combination they improve the mouth feel of the juice or soup and thereby simulate the natural food. It was further found that these dietary fiber materials, in combination, can be useful in dietary, i.e.; weight loss, and laxative or stool softening programs. Also, the drinking of these simulated fresh foods keeps a "full" feeling for extended periods of time and thus results in a putting off of pangs of hunger that occur when persons try to diet. For this reason, simulated orange juice and tomato juice or soup and other pleasant tasting compositions of the invention are useful for dietary control.

SUMMARY OF THE INVENTION

The invention comprises, in a water-reconstitutable juice or soup composition, the improvement, which comprises; a proportion of dietary fibers consisting essentially of from 10 to 90 parts by weight of a protopectin containing substance and from 10 to 90 parts by weight of a cellulose type of dietary fiber, said cellulose type of dietary fiber being coated to render the fiber hydrophobic.

DETAILED DESCRIPTION OF THE PREFERRED EMBODIMENTS OF THE INVENTION

Considering the invention in greater detail, it has been found that certain natural protopectin containing products such as citrus pulp, such as orange or lemon or grapefruit sacs when dried and ground to a medium to fine power will resist the absorption of moisture long enough so that they will impart to a dry, juice forming composition upon reconstitution with water, the mouth feel of a naturally prepared fruit or vegetable juice. In attempting to thicken the juice further, it was found that by adding a food cellulose dietary fiber it was possible to achieve the thickening effect. However, the cellulose absorbed so much moisture that it made the juice mixture too thick before drinking. Further, the thickened juice masked the mouth feel of a freshly prepared juice or soup created by the protopectin. By coating the cellulose fiber with a hydrophobic material, for example a lipid such as vegetable oil emulsified with an emulsifier such as lecithin, or like lipid materials, moisture absorption could be retarded until after the product had been consumed. Advantageously, the ratio of protopectin containing material such as citrus pulp to cellulose fiber is within the range of from about 10:90 to 90:10, preferably 60:40 to 40:60 and most preferably 50:50. The latter ratio provides a very nice mouth feel and simulates the freshly prepared product. Thus, a combination of dried and ground orange sacs or other citrus sacs or components such as a specially prepared albedo, in a specific combination with a cellulose type of dietary fiber material, which has been coated with a hydrophobic substance such as lipid in an emulsion which coats without clumping or separation, produces in combination with conventional flavoring and coloring agents, a dry product which when reconstituted with water simulates a natural, freshly prepared material such as fruit or vegetable juice. The proportion of protopectinic and cellulosic dietary fiber employed in the compositions of the invention may range widely. In general, it is advantageous to employ a proportion of from 1 to about 50 percent by weight of the dry food composition to which it is added.

It was also found that the length of the fiber of the cellulose fiber component is important in achieving the desirable bulk forming condition and is particularly important in obtaining the desired mouth feel characteristics. For example, a formulation of juice material was prepared using a very short cellulose fiber (average size 28 microns). This is a microcrystalline cellulose, which is also an excellent thickening agent. However, upon drinking, the material stuck to the roof of the mouth, even though the cellulose was coated. Also, it was too thick to simulate orange juice when used in the ratio of 50:50 with a protopectin type of material. When the ratio was reduced to less than 50:50 it was found that this had no desirable dietary effect or bulking effect but produced an unusual amount of gas and some undesirable gas pains upon digestion. also, the product gelled up in the glass and formed an unpleasant thick mouth feel. It appears that it is advantageous to have cellulose fiber material which is of a fiber length large enough to be coated and to be sufficiently hydrophobic so as to avoid setting up in a gel-like material prior to drinking. Advantageously, this is met when at least about 50 percent of the cellulose fiber has a minimum length of about 1/200th of an inch. In order to have the fecal bulking effect it also appears desirable that the coated fiber be moisture absorbant in the intestine, after the protective coating of lipid is digested. Thus, it is desirable that the lipid coating be digestible.

Because the various materials described above have natural affinities for moisture, it is important to keep the product compositions of the invention in a dry form (preferably less than 10% moisture) in order to be certain that the fresh-prepared mouth feel is simulated, and unpleasant thickening of the material is avoided.

The following examples set forth the best mode contemplated by the inventor for making and using the invention but are not to be construed as limiting.

EXAMPLE 1

| Ingredients | Percentage by Weight |
| --- | --- |
| dried orange sac flour | 21.0 |
| SOLKA-FLOC ©* | 21.0 |
| sucrose | 48.0 |
| citric acid | 2.5 |
| a gum agent | 1.6 |
| a lipid material (Durkex 500)** | 4.0 |
| lecithin or like emulsification agent | .4 |
| ascorbic acid | .5 |
| artificial flavors | .7 |
| coloring agents | .3 |
|  | 100.0 |
| service size | 25 grams |

*A cellulose dietary fiber characterized in that less than 1% will stay on a 35 mesh screen, not less than 85% will pass through a 100 mesh screen and not less than 70% will pass through a 200 mesh screen; Brown Co.
**A high stability, low rancidity, vegetable oil, fractionated to remove lauric acid.

The SOLKA-FLOC© material is placed in a V-blender or ribbon-blender type of device and the powder material while being tumbled is sprayed with a fine spray of the homogenized combination of the lipid and emulsifier material. This is blended until the lipid has entirely coated the cellulose material. The orange sac flour is then added to the ribbon blender and the blender is run again until the orange sac flour and coated cellulose material have blended into a homogeneous mixture.

In a separate bin the sugar, citric acid, and ascorbic acid and dry colors are blended until homogeneous. The two large bulk materials are then added to each other and are then sprayed with the two liquid materials, the artificial flavors and the gum material. Keeping the mixture dry, the mixture is packaged into individual dose packages or placed in a jar with a scoop for administering the 25 grams per 8-ounce glass. The material is readily reconstituted with water by either adding the powder to 8 ounces of water or adding the water to the 25 grams of powder and stirring, shaking, or blending. The resulting juice drink has the taste and mouth feel of the natural, freshly prepared juice corresponding to the flavor ingredient used. Upon ingestion, there is a feeling of satiety.

EXAMPLE 2

The procedure of Example 1 is repeated except that the sacs are ground into a fine powder with particles that will go through a 50 screen. This has an effect on the thickening and mouth feel of the final product and is particularly well suited to the simulated mouth feel of tomato juice and soup.

EXAMPLE 3

The procedure of Example 1, supra., is repeated except that the proportion of sucrose as used therein is reduced to 5 percent and 43 percent of tomato powder and tomato juice seasoning is added to obtain a composition which on addition of water provides a tomato juice having a mouth feel that closely simulated natrual, freshly squeezed tomato juice. The ingestion of the reconstituted material promotes a feeling of satiety and bowel regularity.

EXAMPLE 4

The procedure of Example 1 is repeated except the sucrose as used therein is replaced with saccharin or like sugar substitute. The produce juice is comparable in taste to the freshly prepared juice simulated.

EXAMPLE 5

Repeating the procedure of Example 3, supra., but replacing the seasoning as used therein with tomato soup seasoning, a soup composition is obtained which upon addition of hot water forms a delicious soup, thick, and rich and with excellent mouth feel.

EXAMPLE 6

An orange flavored composition prepared in accordance with the procedure of Example 1, supra., is administered at a dose of 10 gms. of water-reconstituted powder, daily to a human suffering from irregular bowels. After about two days, regularity of bowel movements was achieved without undesirable side effects such as diarrhea or constipation.

Obviously, many modifications and variations of the invention, described herein above and below in the claims, can be made without departing from the essence and the scope thereof. For example, the cellulose type of fiber may be coated with any edible material which will render it hydrophobic. For example, the coating may be of lipids which are solid at room temperature but which can be coated while they are melted at elevated temperatures, edible shellac and like coatings, and other water repelling coating materials which are edible. Likewise, although it is preferred to use citrus materials containing protopectin, the pure protopectin or like forms may be employed to provide the protopectin component of the compositions of the invention.

What is claimed:

1. In a water-reconstitutable juice composition which comprises flavoring and coloring agents, the improvement, which comprises; the presence of a proportion of dietary fibers, which comprises from 10 to 90 parts by weight of a protopectin and from 10 to 90 parts by weight of a cellulosic dietary fiber which is coated to render the cellulose fiber hydrophobic.

2. The composition of claim 1 wherein the ratio of protopectin to cellulosic dietary fiber is 50:50.

3. The composition of claim 1 wherein the protopectin is obtained from naturally occurring material.

4. The composition of claim 3 wherein said natural material is citrus pulp.

5. The composition of claim 1 wherein at least 50 percent of the cellulose dietary fiber has a fiber length of not less than 1/200th of an inch.

6. The composition of claim 1 wherein said coating is of an edible lipid.

7. The composition of claim 6 wherein said lipid is a vegetable oil.

8. In a water-reconstitutable soup composition which comprises flavoring and coloring agents, the improvement, which comprises; the presence of a proportion of dietary fibers, which comprises, from 10 to 90 parts by weight of a protopectin and from 10 to 90 parts by weight of a cellulosic dietary fiber which is coated to render the cellulosic fiber hydrophobic.

9. The composition of claim 8 wherein the ratio of protopectin to cellulosic dietary fiber is 50:50.

10. The composition of claim 8 wherein the protopectin is obtained from naturally occurring material.

11. The composition of claim 10 wherein said natural material is citrus pulp.

12. The composition of claim 8 wherein at least 50 percent of the cellulose dietary fiber has a fiber length of not less than 1/200th of an inch.

13. The composition of claim 8 wherein said coating is of an edible lipid.

14. The composition of claim 13 wherein said lipid is a vegetable oil.

UNITED STATES PATENT AND TRADEMARK OFFICE
CERTIFICATE OF CORRECTION

PATENT NO. : 4,198,400
DATED : April 15, 1980
INVENTOR(S) : Myron A. Beigler

It is certified that error appears in the above-identified patent and that said Letters Patent are hereby corrected as shown below:

On the Title Page: Underneath "UNITED STATES PATENT" the name "Biegler" should read -- Beigler --

On the Title Page: After the word "Inventor" the name "Biegler" should read -- Beigler --

Signed and Sealed this

Twenty-ninth Day of July 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,198,400
DATED : April 15, 1980
INVENTOR(S) : MYRON A. BEIGLER

It is certified that error appears in the above-identified patent and that said Letters Patent are hereby corrected as shown below:

At col. 4, claim 1, line 7; "cellulose" should be

--cellulosic--

At col. 6, claim 12, line 2; "cellulose" should be

--cellulosic--

Signed and Sealed this

Fourth Day of November 1980

[SEAL]

Attest:

SIDNEY A. DIAMOND

Attesting Officer

Commissioner of Patents and Trademarks